US006249515B1

United States Patent
Kim et al.

(10) Patent No.: US 6,249,515 B1
(45) Date of Patent: Jun. 19, 2001

(54) MULTIPLE ACCESS CONTROL METHOD FOR GUARANTEEING QOS REQUIREMENT

(75) Inventors: Yong Jin Kim; Jang Kyung Kim, both of Daejeon; Chung Gu Kang, Seoul, all of (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/123,019

(22) Filed: Jul. 28, 1998

(30) Foreign Application Priority Data

Dec. 17, 1997 (KR) .................................... 97-69536

(51) Int. Cl.[7] .......................... H04Q 11/04; H04L 12/38; H04L 12/56
(52) U.S. Cl. ........................ 370/337; 370/349; 370/395; 370/444; 370/447; 455/450
(58) Field of Search ..................................... 370/329, 336, 370/337, 345, 347–348, 395, 442, 443, 445, 447, 444, 458, 462, 338, 349, 341, 431; 455/450, 451, 452

(56) References Cited

U.S. PATENT DOCUMENTS

| 5,014,266 | * | 5/1991 | Bales et al. ........................... 370/354 |
| 5,623,495 | * | 4/1997 | Eng et al. ............................. 370/337 |
| 5,974,036 | * | 10/1999 | Acharya et al. ...................... 370/338 |
| 6,078,575 | * | 6/2000 | Dommety et al. .................... 370/395 |

FOREIGN PATENT DOCUMENTS

0621708A2   10/1994 (EP) .

WO94/17606   8/1994 (WO) .

OTHER PUBLICATIONS

Dipankar Raychaudhuri et al., "ATM–Based Transport Architecture for Multiservices Wireless Personal Communication Networks", IEEE Journal on Selected Areas in Communications, vol. 12, No. 8, Oct. 1992, pp. 1401–1414.
Mark J. Karol et al., "Distributed–Queueing Request Update Multiple Access (DQRUMA) for Wireless Packet (ATM) Networks", 1995 IEEE, pp. 1224–1231.
Dietmar Petras, "Medium Access Control Protocol for Transparent ATM Access in MBS", Dept. Of Communication Networks, Aachen Univ. Of Technology.
Yong Jin Kim et al., "Extended Dynamic Slot Assignment Protocol for Wireless ATM", Proceedings of the 4th International Workshop on Mobile Multimedia Communications, Sep. 29–Oct. 2, 1997, Seoul Korea, pp. 526–529.

* cited by examiner

Primary Examiner—Alpus H. Hsu
Assistant Examiner—Afsar M. Qureshi
(74) Attorney, Agent, or Firm—Jacobson, Price, Holman & Stern, PLLC

(57) ABSTRACT

A multiple access control method for guaranteeing a QoS requirement is disclosed. The method includes the steps of a first step in which the random access channel is separated into a plurality of sub-slots, and one of the thusly separated sub-channels is designated as a forced collision sub-slot and is shared for a mobile station which is sensitive to a reservation delay time, and a second step in which capacity-back (CB) sub-slots are designated one-by-one with respect to the mobile station, which is sensitive to the reservation delay time in the next slot when a collision occurs in the designated forced sub-slot and a reservation request is performed without a predetermined competition.

3 Claims, 3 Drawing Sheets

MULTIPLE ACCESS CONTROL METHOD FOR GUARANTEEING QOS REQUIREMENT

BACKGROUND OF THE INVENTION

1. Field of the Invention

The present invention relates to a multiple access control method for guaranteeing a QoS requirement. More particularly, the present invention relates to an improved multiple access control method for guaranteeing a QoS requirement, which is capable of effectively implementing a time division multiple access (TDMA)-based dynamic reservation method for a wireless asynchrnous transfer mode (ATM) in a medium access control protocol.

2. Description of the Prior Art

In the conventional random access method, the priority which is implemented based on a delay time request of a traffic characteristic of a mobile station is not considered. Even through the priority is considered, it is difficult to implement a method for guaranteeing a reserved request delay time based on the priority.

In the US Patent "Medium Access Control Protocol for Wireless Network (Application No.: PCT/US94/00996, patent Ser. No. 94-17606, Jan. 27, 1994)", one of nodes for implementing a communication between the nodes is designated as a hub station, and the remaining nodes are designated as a remote station, so that a radio channel is effectively utilized in accordance with the control of the sub station.

An outbound period (toward a remote station direction), an inbound period (toward a hub station direction), and an interval between the outbound period and the inbound period are determined in a communication period between the hub station and the remote station. Therefore, an electric power is supplied to the hub and remote stations during a corresponding transfer/receiving time for thereby decreasing the consumption of the electric power. In addition, the radio channel is effectively used by controlling the number of transfers and period by enabling a remote operation based on the control of the hub station. There is provided an algorithm determining the hub station between the base stations.

In the above-described U.S. patent, the remote cells which transmit the identical traffics are disclosed based on a multicell packed technique by controlling the number of transfers to the remote station and a transfer time. However, there are problems in that it is impossible to decrease a cell delay variation when supporting a real time traffic based on an ATM network, and an accurate slot allocation is not implemented.

Next, In the European Patent "An Adaptive medium access scheme for wireless LAN (Application No.: 94105695.2, patent Ser. No.: 0 621 708 A2, Oct. 26, 1994", a medium access control method by which a plurality of remote stations can share a radio channel under a wireless LAN environment is disclosed. However, the medium access control is implemented based on a central control method, and the medium access control protocol is implemented using a reservation method for a user data traffic, and the control and signal traffic is implemented based on a random access method.

One communication period is divided into three time bands A, B and C. The A time band is utilized for a downstream data (from a reference direction toward a remote base direction), the B time band is utilized for a upstream data (from a remote station direction to a reference direction, and the C time band is utilized for a control and signal information transfer. The data slot allocations of the A and B time are implemented in the base station and are determined by a slot request from the remote direction. It is possible to increase the efficiency of the channel by dynamically controlling the duration of the A, B, and C time.

However, in the traffic characteristic of the mobile station for the random access method, the priority based on the delay request time is not considered. Even though the priority is considered, a method which is capable of guaranteeing a reservation request delay time based on the priority is not disclosed.

SUMMARY OF THE INVENTION

Accordingly, it is an object of the present invention to provide a multiple access control method for guaranteeing a QoS requirement which overcomes the aforementioned problems encountered in the conventional art.

It is another object of the present invention to provide a multiple access control method for guaranteeing a QoS requirement which is capable of implementing a band delay time based on a band reservation request when a medium access control protocol is utilized with respect to a dynamic reservation method for mobile stations distributed in a wireless ATM network.

It is another object of the present invention to provide a multiple access control method for guaranteeing a QoS requirement which is capable of performing a band allocation for a mobile station in a wireless ATM based on a reservation request.

It is another object of the present invention to provide a multiple access control method for guaranteeing a QoS requirement which is capable of implementing a band reservation request based on a random access channel (RACH) for a medium access control protocol.

It is another object of the present invention to provide a multiple access control method for guaranteeing a QoS requirement which is capable of implementing a reservation request based on a designated random access (RACH) sub-slot without a competition for guaranteeing a band reservation request in real time.

It is another object of the present invention to provide a multiple access control method for guaranteeing a QoS requirement which is capable of maximizing a band efficiency by dynamically allocating a random access sub-slot when a band reservation request is needed by avoiding an allocation of a sub-slot based on a forced collision sub-slot.

It is another object of the present invention to provide a multiple access control method for guaranteeing a QoS requirement which is capable of guaranteeing a good service quality of multiple mobile stations having various traffic characteristics by utilizing a predetermined access procedure for a random access channel in an upward link among a wireless ATM network medium access control protocol, for thereby extending the ATM service range to a wireless range.

It is another object of the present invention to provide a multiple access control method for guaranteeing a QoS requirement which is capable of implementing a predetermined sub-slot construction and a band reservation request procedure based on a random access channel (RACH) under a dynamic reservation medium access control protocol of a TDMA.

It is another object of the present invention to provide a multiple access control method for guaranteeing a QoS requirement which is implemented by providing a random access channel which is directed to separating one slot into a plurality of sub-slots, designating one sub-slot among the thusly separated sub-slots as a forced collision sub-slot and sharing the thusly designated sub-slot for the mobile stations which are sensitive to the reservation delay time.

It is another object of the present invention to provide a multiple access control method for guaranteeing a QoS requirement which is capable of performing a reservation request without competition by designating a CB sub-slot one-by-one with respect to the mobile stations which are sensitive to a reservation delay time in the next slot when a predetermined collision occurs in the thusly designated forced collision sub-slot.

It is another object of the present invention to provide a multiple access control method for guaranteeing a QoS requirement which is implemented by utilizing a sub-slot configuration in which a forced collision sub-slot and a CB sub-slot are designated by separating a random access channel for thereby guaranteeing a band reservation request delay time.

In order to achieve the above objects, there is provided a multiple access control method for guaranteeing a QoS requirement which includes the steps of a first step in which the random access channel is separated into a plurality of sub-slots, and one of the thusly separated sub-channels is designated as a forced collision sub-slot and is shared for a mobile station which is sensitive to a reservation delay time, and a second step in which capacity-back (CB) sub-slots are designated one-by-one with respect to the mobile station which is sensitive to the reservation delay time in the next slot when a collision occurs in the designated forced sub-slot and a reservation request is performed without a predetermined competition.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
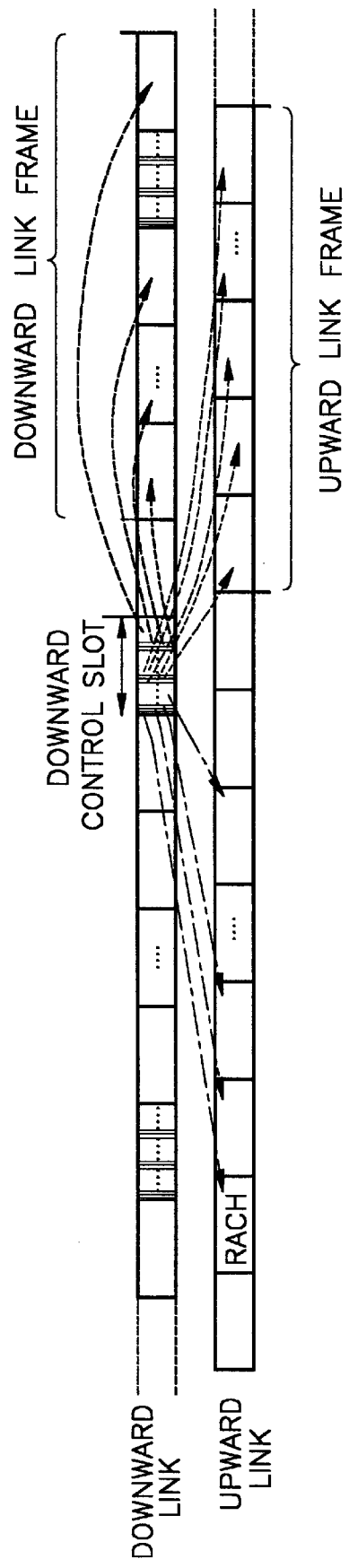
FIG. 1 is a view illustrating a frame structure of an upward and downward link for a medium access control protocol based on a TDMA (Time Division Multiple Access) for a wireless asynchronous transfer mode (ATM) according to the present invention.

FIG. 1 is a view illustrating a frame structure of an upward and downward link for a medium access control protocol based on a TDMA (Time Division Multiple Access) for a wireless asynchronous transfer mode (ATM) according to the present invention. As shown therein, the information concerning the slot allocated to each terminal, the allocation information of the RACH sub-slot, and the information concerning a success with respect to the data transmitted from the mobile station are transferred through the control slot of the downward link, and the reservation request of each mobile station is implemented based on the RACH of the upward link.

Figure 2:
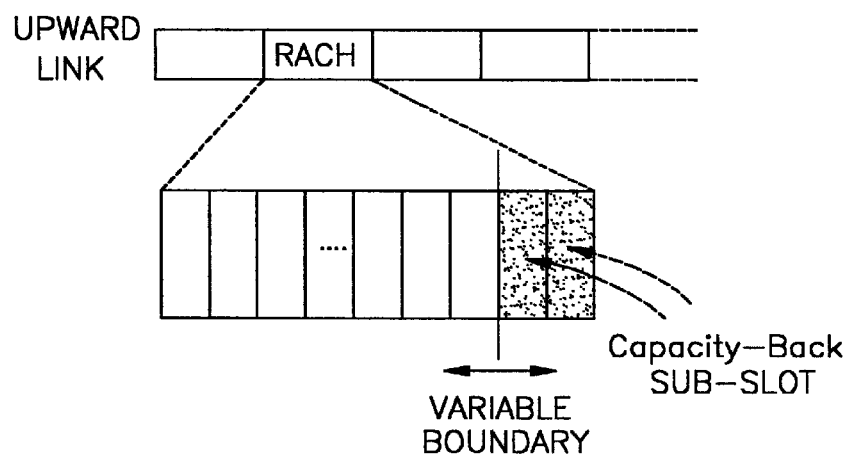
FIG. 2 is a view illustrating a RACH (Random Access Channel) slot for separating a RACH of an upward link into a plurality of sub-slots and implementing a broadband reservation request based on a random access method for a mobile station using each sub-channel.

FIG. 2 is a view illustrating a RACH (Random Access Channel) slot for separating a RACH of an upward link into a plurality of sub-slots and implementing a broadband reservation request based on a random access method for a mobile station using each sub-channel. There are the following two cases in which each mobile station uses a RACH.

The first case is implemented when a call is generated, and then a call setting is requested. Therefore, in this case, a connection specific parameter is transmitted. The second case is implemented when a new ATM cell burst is generated after the ATM cell in the ready mode in the mobile station becomes empty, and then the reservation request is transferred.

At this time, in the case of the traffic which is sensitive to the delay time like the real time data, since the second case is an important variable when providing a service, it is possible to guarantee a real time reservation delay time by transmitting a band request information without competition when a new ATM cell is guaranteed by designating a part of the sub-slot of the RACH as a CB sub-slot in the case of the traffic sensitive to the delay time.

In addition, the remaining sub-slots except for the CB sub-slot among the RACH are shared in a competition method based on the mobile station, which does not request the real time reservation delay.

Figure 3:
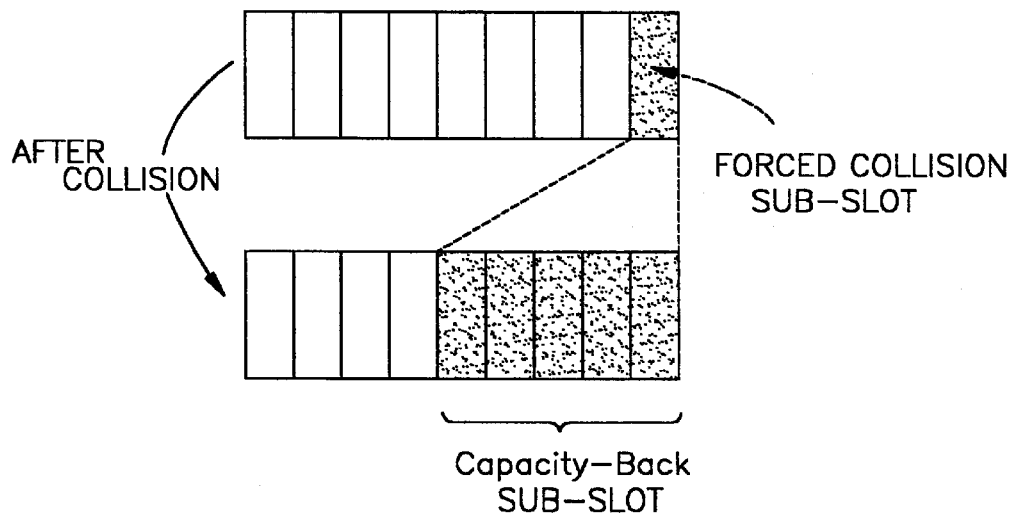
FIG. 3 is a view illustrating a RACH slot based on a method for dynamically allocating a capacity-back sub-slot using a forced collision of a sub-slot for a RACH of an upward link according to the present invention.

FIG. 3 is a view illustrating a RACH slot based on a method for dynamically allocating a capacity-back sub-slot using a forced collision of a sub-slot for a RACH of an upward link according to the present invention. As shown therein, there is shown a method for maximizing the efficiency of the CB sub-slot of FIG. 2 among the access methods of the RACH.

The above-described CB sub-slots are allocated to the real time traffic for thereby implementing a real time reservation delay.

If a plurality of sub-slots are allocated as the CB sub-slot, the number of the real time variable bit rate (VBR) which are really activated is decreased, and then a part of the CB sub-slots is not used, the consumption of the CB sub-slots is increased, so that a random access function of other traffic is decreased.

Therefore, in this case, one CB sub-slot is designated as a forced collision sub-slot, so that an initial competition is performed using the thusly designated slot with respect to all real time VBR traffics.

The number of the CB sub-slots are individually allocated to all real time reservation request mobile stations only when a collision occurs when accessing the forced sub-slot.

However the forced collision sub-slot is maintained to increase an efficiency of the CB sub-slot allocation method if the collision does not occur.

Figure 4:
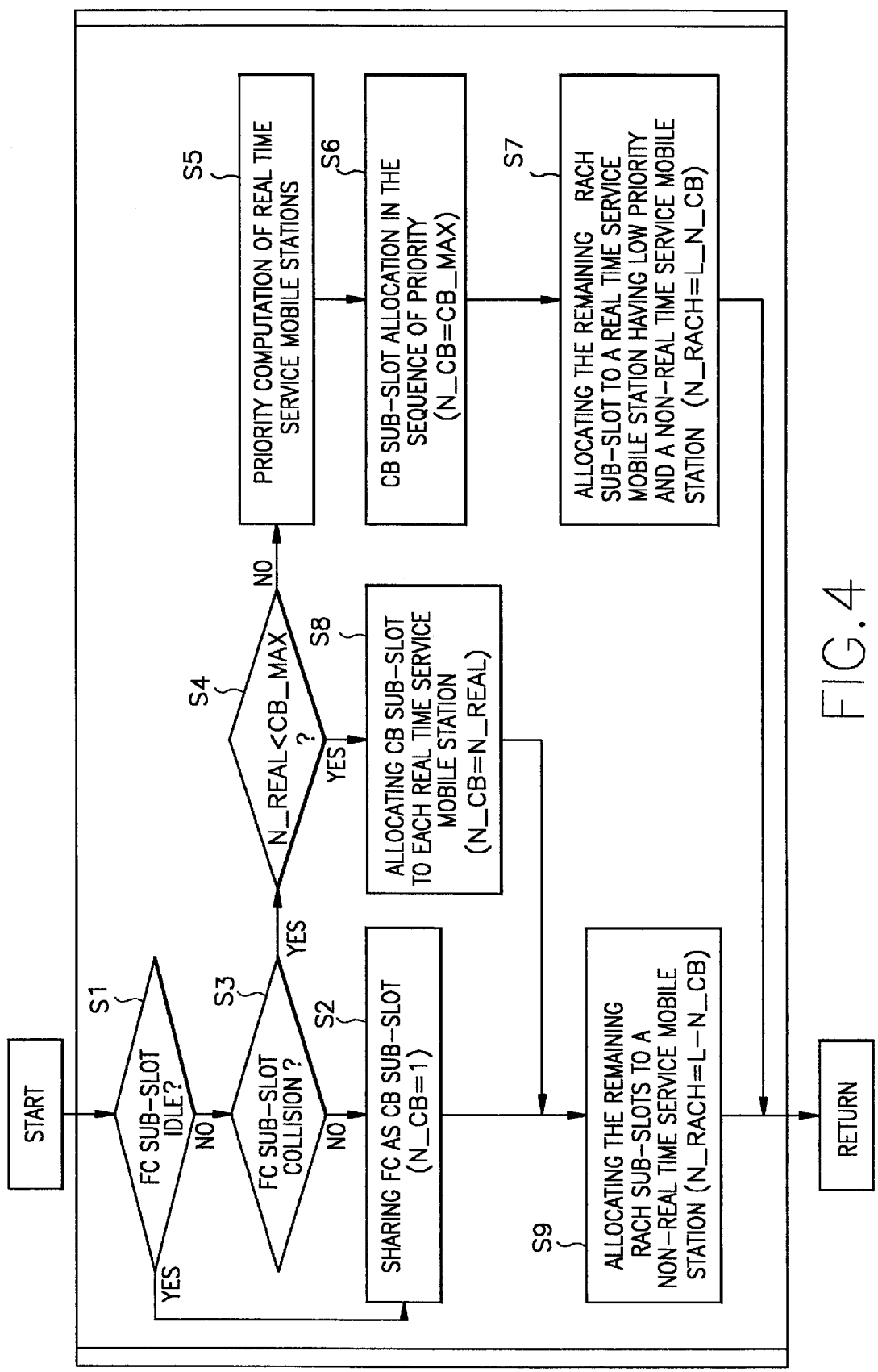
FIG. 4 is a flow chart illustrating a frame unit capacity-back sub-slot designation method for a base station of an upward link random access channel for a wireless ATM medium access control protocol according to the present invention.

FIG. 4 is a flow chart illustrating a frame unit capacity-back sub-slot designation method for a base station of an upward link random access channel for a wireless ATM medium access control protocol according to the present invention. As shown therein, the base station checks the forced collision sub-slot at every frame and performs an allocation with respect to the RACH sub-slot.

The forced collision sub-slot is judged to be an idle state in Step S1. As a result of the judgement, if the forced collision sub-slot is in the idle state, it represents there is no change in the state of all the real time service mobile stations. Therefore, one forced collision sub-slot is continuously used as a CB sub-slot, the remaining RACH sub-slots, namely, the sub-slots except for the CB sub-slots (N_CB) among the entire RACH sub-slots (L) are allocated for the non-real time mobile stations in Step S2.

As a result of the judgement, it is judged that a predetermined collision occurred in the forced sub-slot in Step S3 if the sub-slot is not in the idle state. As a result of the judgement, the number (N_REAL) of real time service mobile stations is compared with the number (CB_MAX) of the maximum CB sub-slot allocations in step S4 if the collision occurred in the forced sub-slot.

As a result of the comparison, if the number of the real time service mobile stations is larger than the number of the maximum CB sub-slot allocations, the priority of corresponding real time service mobile stations is computed in Step S5, and the CB sub-slots are allocated as many as the number of the remaining RACH sub-slots in Step S6, and then the remaining real time service mobile stations are allocated for the real time service mobile station of the low priority and the non-real time service mobile station using the remaining RACH sub-slots in Step S7.

As a result of the judgement, if the number of the real time service mobile stations is not larger than the number of the maximum CB sub-slot allocations, the CB sub-slots are allocated for the real time service mobile stations as many as the real time service mobile stations in Step S8, and the remaining RACH sub-slots are allocated for the non-real time service mobile station in Step S9.

If the forced collision sub-slot is not in the idle state, and the collision does not occur, it represents that one real time service mobile station successfully accessed. Therefore, the CB sub-slot of the RACH allows the forced collision sub-slot to be continuously used, and the remaining RACH sub-slots are allocated to the non-real time service mobile stations in Step S9.

As described above, in the present invention, it is possible to guarantee a reservation request delay time with respect to the traffic of a variable bit rate sensitive to the delay time in the wireless ATM network, so that a predetermined quality as in the wire ATM network is implemented using a predetermined wireless source.

Although the preferred embodiments of the present invention have been disclosed for illustrative purposes, those skilled in the art will appreciate that various modifications, additions, and substitutions are possible, without departing from the scope and spirit of the invention as recited in the accompanying claims.

What is claimed is:

1. In a method in which mobile stations share a random access channel (RACH) of an upward link of a TDMA (Time Division Multiple Access) used in a wireless asynchronous transfer mode (ATM) network, wherein a multiple access method comprising the steps of:

a first step in which the random access channel is separated into a plurality of sub-slots, and one of the thusly separated sub-channels is designated as a forced collision sub-slot and is shared for a mobile station which is sensitive to a reservation delay time; and a second step in which capacity-back (CB) sub-slots are designated one-by-one with respect to the mobile station which is sensitive to the reservation delay time in the next slot when a collision occurs in the designated forced collision sub-slot and a reservation request is performed without a predetermined competition.

2. The method of claim 1, wherein said first step includes:

a first sub-step in which one forced collision slot is continuously used as a CB sub-slot when the forced collision sub-slot is in an idle state; and a second sub-step in which the sub-slots except for the CB sub-slots (N_CB) are allocated for a non-real time mobile station in the entire RACH sub-slots (L).

3. The method of claim 1, wherein said second step includes:

a first sub-step for judging whether a collision occurred in the forced sub-slot when the sub-slot is not in the idle state and comparing the number (N_REAL) of the real time service mobile stations with the number (CB_MAX) of the maximum CB sub-slot allocations when a collision occurred in the forced sub-slot;

a second sub-step for computing a priority of a corresponding real time service mobile station when the number of the real time service mobile stations is larger than the number of the maximum CB sub-slot allocations and allocating the CB sub-slots as many as the number (CB_MAX) of the maximum CB sub-slot allocations in a predetermined sequence;

a third sub-step for allocating the remaining real time service mobile stations to the real time service mobile station of a lower priority and the non-real time service mobile station using the remaining RACH sub-slots;

a fourth sub-step for allocating the CB sub-slots to the real time service mobile stations as many as the number of the real time service mobile stations when the number of the real time service mobile stations is not larger than the number of the real time service mobile stations and allocating the remaining RACH sub-slots to the non-real time service mobile stations;

a fifth sub-step for judging that one real time service successfully accessed when the forced collision sub-slot is not in the forced collision sub-slot, and the collision is not occurred and continuously using the forced collision sub-slot; and a sixth sub-step for allocating the remaining RACH sub-slots to the non-real time service mobile stations.

* * * * *